Patented Aug. 2, 1949

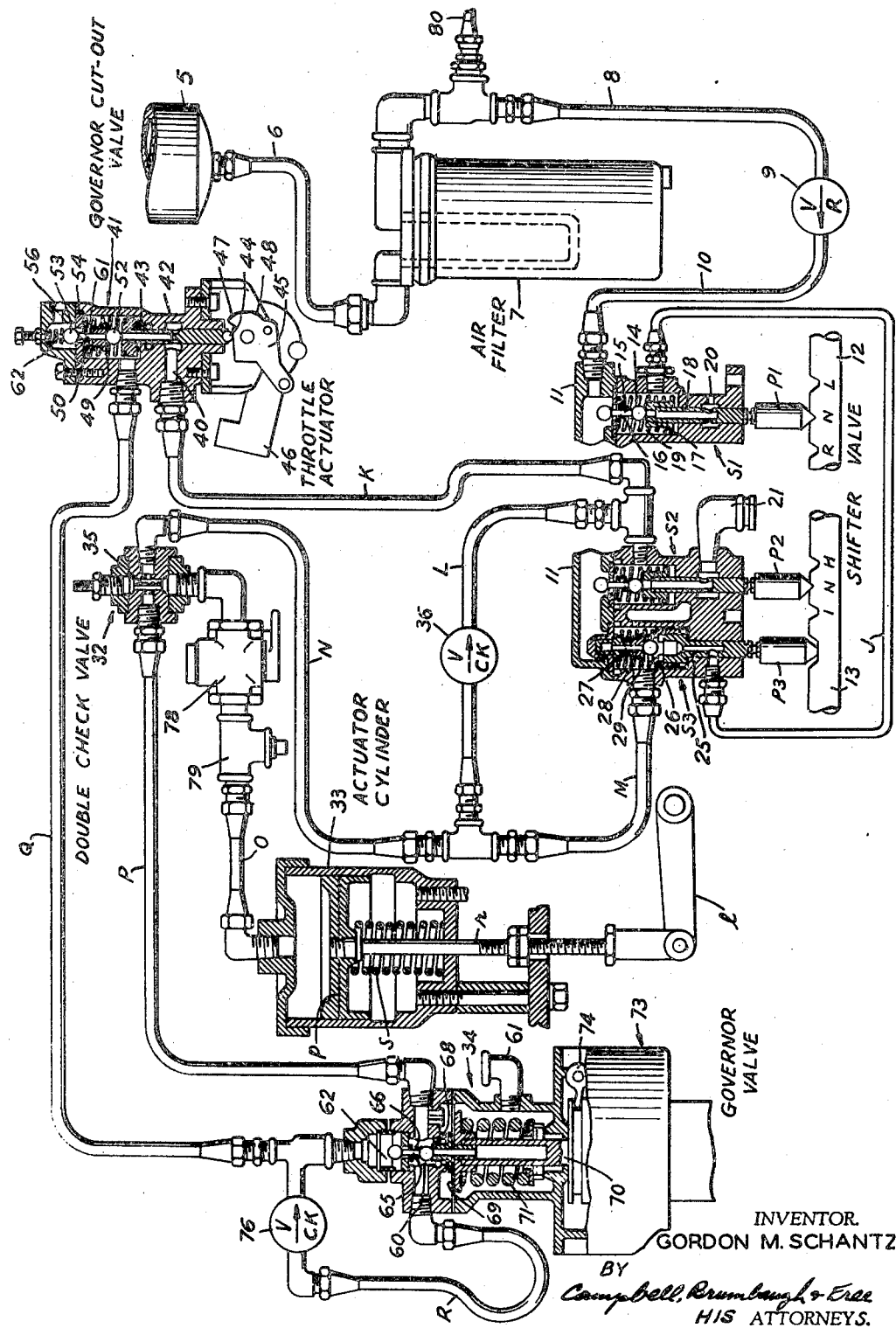

2,478,058

UNITED STATES PATENT OFFICE 2,478,058

AUTOMATIC CLUTCH CONTROL

Gordon M. Schantz, Allentown, Pa., assignor to Mack Manufacturing Corporation, New York, N. Y., a corporation of Delaware Application March 27, 1945, Serial No. 585,173

15 Claims. (Cl. 192—.052)

This invention relates to automatic clutch control systems and embodies, more particularly, an improved automatic clutch control system in which full clutch engagement is insured under all conditions of operation when full clutch engagement is important and especially when the engine is originally speeded up to start the engine in low gear.

One of the objects of this invention is the provision of means for keeping out surges of air that would normally enter the system when the engine slows down under the starting load, so as to provide for a smooth starting because the clutch cannot become disengaged and "hunt," making it easier for poor or inexperienced drivers to make satisfactory starts, and compensating for a poor system adjustment or for harsher acting clutches by eliminating the possibility of clutch hunting.

Other objects of this invention will appear from the following description taken in connection with the accompanying drawing, in which the single view illustrates more or less diagrammatically the control system and appurtenances embodying this invention. Reference may be had to the U. S. Patent to Zeller, 2,259,599, October 31, 1941, for a disclosure of a power operated clutch mechanism in a system of this same general character employing certain mechanism employed in the present system.

Referring to the drawing, the operating air under pressure is supplied from a reservoir 5 through a pipe 6, an air filter 7, a pipe 8, a pressure reducing valve 9, and a pipe 10 to a manifold 11 for the shifter valves S1, S2, and S3. These valves are controlled by the low and reverse and the intermediate and high shifter rods 12 and 13, in co-operation with valve operating plungers P1, P2, and P3.

The shifter valves S1 and S2 are of the same construction, and each, as indicated by references applied on valve S1, consists of a dumbell valve element 15 normally urged downwardly by a spring 16 to seat the upper ball and close the passage to the valve chamber 14 within the valve body when the plunger P1 is lowered and to hold the lower ball seated on a valve seat 17 on the end of a tubular member 18 of the plunger P1 when the plunger is raised. The plunger is urged downwardly by a spring 19 to move the valve seat 17 downwardly when the shifter rod 12 is moved into low or reverse position, to permit air to pass the lower ball into the bore of the member 18 and out through an exhaust port 20 into the atmosphere. Air from the reservoir 5 entering the chamber 14 of the valve S1 past the upper ball of the valve 15 flows through a pipe J to the valve S3, and the air from the valve S3 may be discharged through the pipe J and exhaust port 20 of the valve S1.

Air from the reservoir 5 entering the valve S2 flows into the pipes K and L, connected to other elements of the system described later, and air in the pipes K and L under certain conditions may be discharged through the valve S2 and its exhaust port 21 into the atmosphere.

The plunger P3 is provided with a slidable tubular member 25 ported for the passage of air from the pipe J into the valve chamber of the valve S3 and from thence into the pipe M connected to other elements of the system described later, when the valve is unseated as shown in the drawing. When the plunger P3 is raised, a valve seat 26 carried by the tubular member 25 is moved against the ball of a valve 27 normally urged downwardly by a spring 28. The plunger P3, together with the valve seat 26 and member 25, are normally urged downwardly against the shifter rod 13 by a spring 29.

The pipe M is connected by a pipe N to one side of a double check valve 32 and through it to a pipe O connected to the clutch actuator cylinder 33 for the passage of air from the pipe N into the pipe O. Air admitted into the clutch cylinder 33 moves the piston p into the position shown in the drawing against the opposition of the clutch-engaging spring s, and through its piston rod r operates the clutch lever l to disengage the clutch (not shown) which is of any ordinary construction. The other side of the double check valve is connected by a pipe P to the governor valve 34. The double check valve includes a diaphragm 35 which permits air from either of the pipes N and P to enter pipe O, and air from pipe O to enter both pipes N and P. A pipe L connects the pipe N to the pipe K for passage of air from the pipe N through a check valve 36 into the valve S2 and out through its exhaust port 21.

The pipe K connects the outlet of the valve S2 to a port 40 of the governor cut-out valve 41. This valve comprises a casing 42 in which is slidably mounted a tubular valve seat 43 provided at its lower end with a ball or roller 44 for co-operation with a throttle cam 45 operated into higher speed position by the throttle actuator 46. This cam is provided with two cam rises 47 and 48, and when in the position shown in the drawing, it permits the tubular valve seat 43 to be lowered by its spring 49 away from a valve element 50 to permit air from the pipe K to pass through the valve 41 into a pipe Q leading to the governor valve 34.

The valve element 50 comprises a lower ball valve 52 co-operating with the valve seat 43 and an upper ball valve 53 co-operating with a valve seat 54 to control the passage of air from the valve chamber into the atmosphere through an exhaust port 56. The upper and lower ball valves are provided with stems, one telescoping into the other, permitting a limited relative movement of the lower ball valve with respect to the upper ball valve, so that the valve seat 43 may be moved upwardly into seating engagement with the lower ball valve by the cam rise 47 of the throttle cam 45 without raising the upper ball valve from its seat. The construction is such that the second rise 48 of the throttle cam 45 in full throttle position will lift the upper ball valve 53 from its seat 54 and connect the pipe Q to the exhaust port 56. The valve seat 43 is normally urged downwardly against the throttle cam by the spring 49. The lower ball valve is normally urged downwardly toward its seat 43 by a spring 61, and a spring 62 urges the upper ball valve toward its seat 54.

The governor valve 34 is provided with a valve chamber 60, an exhaust port 61 and an axial inlet port 62 to which the pipe Q is connected. This latter port is controlled by the upper ball of a dumbbell valve element 65 normally pressed toward its seat by a spring 66. The lower ball of this valve element co-operates with a valve seat 68 secured to a diaphragm 69 and connected to a tubular plunger 70 normally urged upwardly by a spring 71 and adapted to be moved downwardly by a governor mechanism generally indicated at 73 which includes a weighted arm 74 co-operating with said plunger 70.

The valve chamber of the governor valve 34 is also provided with ports in its opposite side walls as shown. The pipe P is connected to one of these ports. A pipe R connected to the other of these ports is connected to the pipe Q through a one-way check valve 76 to permit the flow of air under pressure from the pipe R to the pipe Q.

Connected to the pipe O connecting the double check valve 32 to the clutch cylinder 33 may be a cylinder bleeder valve 78 and a test gauge T 79. Connected to a pipe 8 between the air filter and the pressure-reducing valve may be a pipe 80 that may supply any other mechanism with air pressure, such as a shifter booster. These elements are not a part of this invention.

Operation

When the engine is idling, and the gear shift mechanism is in neutral, the various parts are in the position shown in the drawing. With both of the shifter rods 12 and 13 in the neutral position shown, the pipe 10 is connected through the valve S1 to the pipe J which is connected through the valve S3, pipes M and N, and the right hand side of the double check valve 32 to the clutch actuator cylinder 33 holding the clutch disengaged. The valve S2 also connects the pipe 10 to the pipe K which is connected through the governor cut-out valve 41 to the pipe Q and through the governor valve 34 to the pipe P, but the air in these pipes is static and the clutch is held disengaged through the fluid connection provided by the valves S1 and S3.

When it is desired to shift into low, the shifter rod 12 is shifted for low gear selection. The shifter rod 13 for the intermediate and high gear selection remains in neutral position. In this position of the shifter rod 12 the pipe J is disconnected from the pipe 10, and the fluid pressure flows through the valve S2, pipe K, governor cut-out valve 41, pipe Q, governor valve 34, pipe P, left hand side of the double check valve 32 and pipe O into the clutch actuator cylinder 33, holding the clutch disengaged.

When the throttle is depressed, the throttle actuator and throttle cam 45 will be rocked into a position in which the first rise 47 on the cam 45 has raised the valve seat 43 into contact with the lower ball 52 of the governor cut-out valve element 50, sealing off the pipe K from the pipe Q. When the engine accelerates, the governor 73 moves the valve seat 68 out of contact with the lower ball of the valve 65 connecting the pipe P to the exhaust port of the governor valve and exhausting the air from the clutch actuator cylinder 33 causing the clutch to engage. This is to insure that the clutch will not be engaged before the engine has attained a certain predetermined speed. This maintains the clutch engaged during further acceleration of the engine. In case the throttle is now released and connects the pipe K to the pipe Q, any fluid pressure admitted into the pipe Q will be exhausted through the governor valve and will not enter the clutch cylinder to cause the clutch to disengage. Where the speed of the engine has been reduced sufficiently to shift the governor valve into the position shown in the drawing, it will connect the pipe Q to the pipe P and disengage the clutch.

When the gear shift into low is made under heavy load, the throttle may be opened fully. In this position the second rise 48 on the throttle cam 45, while maintaining engagement between the valve seat 43 and the lower ball valve 52, raises the upper ball valve 53 from its seat and connects the pipe Q to the exhaust port 56. This causes the clutch actuator cylinder 33 to be bled through the pipe O, left hand side of the double check valve 32, pipe P, chamber of the governor valve 34, pipe R, one-way check valve 76, pipe Q and governor cut-out valve 41 and its exhaust port 56. This cuts off the supply of fluid pressure through the shifter valve S2 and places the clutch engagement under the sole control of the throttle, causing the clutch to be firmly engaged regardless of the speed of the engine, which might be less than that required to connect the pipe P to the exhaust port 61 of the governor valve 34 which is the connection controlling the engagement of the clutch during acceleration of the engine and after the engine has attained a certain speed.

When the driver desires to shift into intermediate gear, he releases the throttle and moves the shifter rod 13 to the right until plunger P2 engages with groove I, leaving the low and reverse shifter rod 12 in the neutral position. In this position of the parts the clutch is permitted to engage by the flow of fluid from the clutch actuator cylinder 33 through pipe O, past the right hand side of the double check valve 32, through pipe N, single one-way check valve 36, pipe L, and through the valve S2 and its exhaust port 21 to the atmosphere. With the throttle in the position shown in this figure, a connection is also made from the clutch actuator cylinder 33 through the pipe O, double check valve 32, pipe P, governor valve 34, pipe R, check valve 76, pipe Q, and from governor cut-out valve 41, pipe K, and valve S2 to its exhaust port 21 to bleed air from the pipes P and Q. In this position of the shifter rod 13, the system is sealed off from the fluid pressure reservoir by the shifter valve S3. The clutch will remain engaged under all conditions until the shifter rod 13 is moved into neutral.

The operation of the system when shifting into reverse and high will be the same respectively as when shifting into low and intermediate.

While the invention has been described with particularity with reference to preferred instrumentalities and a preferred arrangement thereof shown in the drawings, it is to be understood that this is not to be considered limiting and that I reserve the right to all such changes as fall within the principles of this invention and the scope of the appended claims.

I claim:

1. The combination of a fluid operated clutch cylinder, a source of fluid supply, gear shift mechanism comprising low and higher speed shifter elements and valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply port to said cylinder and to connect said other valve to the atmosphere to provide a fluid exhaust path.

2. The combination of a fluid operated clutch cylinder, a source of fluid supply, gear shift mechanism comprising low and higher speed shifter elements, and valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply port to said cylinder and to connect said other valve to the atmosphere to provide a fluid exhaust path; said higher speed shifter element operating to close its valve to cut off the supply of fluid pressure to said cylinder upon movement into higher speed position.

3. The combination of a fluid operated clutch cylinder, a source of fluid supply, gear shift mechanism comprising low and higher speed shifter elements, valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply port to said cylinder and to connect said other valve to the atmosphere to provide a fluid exhaust path; said higher speed shifter element operating to close its valve to cut off the supply of fluid pressure to said cylinder upon movement into higher speed position; and a third valve controlled by said higher speed shifter element normally providing a second fluid supply path to said cylinder and operated by said higher speed shifter element when operated into higher speed position to provide a second exhaust path for said cylinder.

4. The combination of a fluid operated clutch cylinder, a source of fluid supply, gear shift mechanism comprising low and higher speed shifter elements, valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply path to said cylinder and to connect said other valve to the atmosphere to provide a fluid exhaust path; said higher speed shifter element operating to close its valve to cut off the supply of fluid pressure to said cylinder upon movement into higher speed position; a third valve controlled by said higher speed shifter element normally providing a second fluid supply path to said cylinder and operated by said higher speed shifter element when operated to provide a second exhaust path for said cylinder, and a throttle controlled valve normally open for the flow of fluid pressure in said second fluid supply path and adapted to close said path upon advancement of said throttle.

5. The combination of a fluid operated clutch cylinder, a source of fluid supply, gear shift mechanism comprising low and higher speed shifter elements, valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply path to said cylinder and to connect said other valve to the atmosphere to provide a fluid exhaust path; said higher speed shifter element operating to close its valve to cut off the supply of fluid pressure to said cylinder upon movement into higher speed position; a third valve controlled by said higher speed shifter element normally providing a second fluid supply path to said cylinder and operated by said higher speed shifter element when operated to provide a second exhaust path for said cylinder; and a throttle controlled valve normally open for the flow of super atmospheric pressure in said second fluid supply path and adapted to close said path upon initial advancement of said throttle and to connect said cylinder to the atmosphere upon full advancement of said throttle.

6. The combination of a fluid operated clutch cylinder, a source of fluid supply, gear shift mechanism comprising low and higher speed shifter elements, valves arranged in series between said source of fluid supply and said cylinder and respectively controlled by said elements in their neutral positions to supply fluid to said cylinder, said low speed shifter element upon movement into low speed position controlling its valve to cut off the supply of fluid through one fluid supply path to said cylinder and to connect said other valve to the atmosphere to provide a fluid exhaust path, said higher speed shifter element operating to close its valve to cut off the supply of fluid pressure to said cylinder upon movement into higher speed position; a third valve controlled by said higher speed shifter element normally providing a second fluid supply path to said cylinder and operated by said higher speed shifter element when operated to provide a second exhaust path for said cylinder; a throttle controlled valve normally open for the flow of superatmospheric pressure in said second fluid supply path and adapted to close said path upon initial advancement of said throttle and to connect said cylinder to the atmosphere upon full advancement of said throttle, and a governor controlled valve normally open for the flow of superatmospheric pressure in said second supply path and adapted upon an increase in speed to connect said clutch cylinder to the atmosphere.

7. In combination with a fluid operated clutch cylinder, a source of fluid supply, gear shift mechanism including low and higher speed shifter elements, valve means controlled by said low shifter element in neutral position to supply fluid to said cylinder, valve means controlled by said higher speed shifter element normally open and located in the fluid supply path controlled by said first mentioned valve means, a third normally open valve means located in a second supply path for said cylinder and closed by said higher speed shifter element as it is moved into high speed position, and exhaust ports controlled by said first and third valve means providing exhaust paths for said clutch cylinder when their respective shifter elements are moved into gear changing positions.

8. In combination with a fluid operated clutch cylinder, a source of fluid supply, gear shift mechanism including low and higher speed shifter elements, valve means controlled by said low shifter element in neutral position to supply fluid to said cylinder, valve means controlled by said higher speed shifter element normally open and located in the fluid supply path controlled by said first mentioned valve means, a third normally open valve means located in a second supply path for said cylinder and closed by said higher speed shifter element as it is shifted into high speed position, exhaust ports controlled by said first and third valve means providing exhaust paths for said clutch cylinder when their respective shifter elements are moved into gear changing positions, and a one-way valve connecting said exhaust path controlled by said first valve means at a point between said second valve means and said cylinder for exhausting said cylinder through the exhaust port controlled by said third valve means when said second valve means is closed.

9. The combination with a fluid operated clutch cylinder, gear shift mechanism, means controlled by said gear shift mechanism normally providing a supply path for said cylinder and adapted upon movement of said gear shift mechanism into low speed position to convert said supply path to an exhaust path, and means also controlled by said gear shift mechanism in another speed position to close said paths and provide a second exhaust path for said cylinder.

10. The combination with a fluid operated clutch cylinder, gear shift mechanism, means controlled by said gear shift mechanism normally providing a supply path for said cylinder and adapted upon movement of said gear shift mechanism into low speed position to convert said supply path into an exhaust path, and means also controlled by said gear shift mechanism as it is moved into another speed position to close said paths and provide a second exhaust path for said cylinder connected to said first path at a point between said first mentioned means and said cylinder.

11. The combination with a fluid operated clutch cylinder, gear shift mechanism, a source of fluid pressure, valve means controlled by said gear shift mechanism when in neutral position providing a pair of fluid supply paths to said clutch cylinder, a speed responsive valve and a throttle controlled valve, both said valves being normally open for the flow of fluid pressure in one of said paths, and means controlled by said gear shift mechanism when it is moved into a low speed position to close the other of said paths, said first mentioned path supplying fluid to said clutch cylinder to hold the clutch disengaged.

12. The combination with a fluid operated clutch cylinder, gear shift mechanism, a source of fluid pressure, valve means controlled by said gear shift mechanism when in neutral position providing a pair of fluid supply paths to said clutch cylinder, a speed responsive valve and a throttle controlled valve, both said valves being normally open for the flow of super atmospheric pressure in one of said paths, and means controlled by said gear shift mechanism when it is moved into a low speed position to close the other of said paths, said first mentioned path supplying fluid to said clutch cylinder to hold the clutch disengaged, said throttle controlled valve in accelerating position interrupting said first mentioned path and said speed responsive valve operating at a predetermined higher than idling speed to connect said first mentioned path to the atmosphere.

13. The combination with a fluid operated clutch cylinder, gear shift mechanism, a source of fluid pressure, valve means controlled by said gear shift mechanism when in neutral position to provide a pair of fluid supply paths to said clutch cylinder, a speed responsive valve and a throttle controlled valve, both said valves being normally open for the flow of super atmospheric pressure in one of said paths, and means controlled by said gear shift mechanism when it is moved into a low speed position to close the other of said paths, said first mentioned path then supplying fluid to said clutch cylinder to hold the clutch disengaged, said throttle valve in accelerating position interrupting said first mentioned path and said speed responsive valve operating at a predetermined higher than idling speed to connect said first mentioned path to the atmosphere, and said throttle valve in full open position of said throttle connecting said clutch cylinder to the atmosphere before said speed responsive means connects said first mentioned path to the atmosphere.

14. In a fluid clutch control system the combination with a clutch cylinder and speed changing mechanism, of two fluid supply paths for said cylinder normally open when said speed changing mechanism is in neutral, and means under control of said speed changing mechanism in one of its speed changing positions to interrupt one of said paths and connect said path to the atmosphere while the other fluid supply path remains open and a double check valve between said paths and said clutch cylinder operable to admit fluid from either path into said cylinder and to close said one path when said path is connected to the atmosphere.

15. In a fluid clutch control system the combination with a clutch cylinder and speed changing mechanism, of two fluid supply paths for said cylinder normally open when said speed changing mechanism is in neutral, a double check valve between said paths and said cylinder operable to admit fluid from either path into said cylinder and to close either path when the other is connected to the atmosphere, means under control of said speed changing mechanism in one of its speed changing positions to interrupt one of said paths and connect said path to the atmosphere into a fluid exhaust path while the other fluid supply path remains open, and means also controlled by said speed changing mechanism when in another speed changing position for connecting said one path at a point adjacent said double check valve to the atmosphere.

GORDON M. SCHANTZ.

REFERENCES CITED

The following references are of record in the file of this patent:

UNITED STATES PATENTS

| Number | Name | Date |
| --- | --- | --- |
| 1,686,827 | Maag | Oct. 9, 1928 |
| 2,237,159 | Neff | Apr. 1, 1941 |
| 2,248,431 | Lenkhardt | July 8, 1941 |
| 2,259,599 | Zeller | Oct. 21, 1941 |
| 2,273,277 | Lenkhardt | Feb. 17, 1942 |
| 2,294,823 | Andres | Sept. 1, 1942 |
| 2,324,830 | Eaton | July 20, 1943 |
| 2,341,631 | Lenkhardt | Feb. 15, 1944 |
| 2,374,869 | Lenkhardt | May 1, 1945 |

Certificate of Correction

Patent No. 2,478,058                                                           August 2, 1949

GORDON M. SCHANTZ

It is hereby certified that errors appear in the printed specification of the above numbered patent requiring correction as follows:

Column 10, list of references cited, lines 5, 7, 10, and 11, respectively, for the name "Lenkhardt" read *Leukhardt*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*